Figure 1:
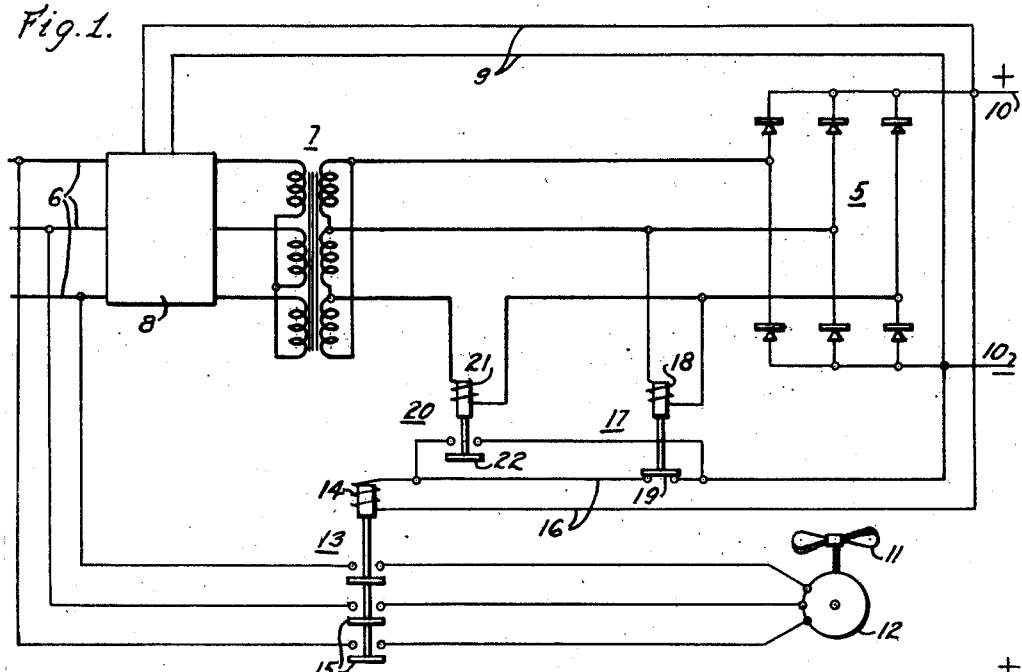

Oct. 24, 1944.   C. G. VEINOTT ET AL   2,361,248

AIRCRAFT RECTIFIER SYSTEM

Filed Oct. 13, 1943

WITNESSES:
Alice S. Howell
F. P. Lyle

INVENTORS
Cyril G. Veinott and
Herman J. Braun.
BY O. B. Buchanan
ATTORNEY

Patented Oct. 24, 1944

2,361,248

UNITED STATES PATENT OFFICE 2,361,248

AIRCRAFT RECTIFIER SYSTEM

Cyril G. Veinott and Herman J. Braun, Lima, Ohio, assignors to Westinghouse Electric & Manufacturing Company, East Pittsburgh, Pa., a corporation of Pennsylvania Application October 13, 1943, Serial No. 506,056

16 Claims. (Cl. 175—363)

The present invention relates to rectifiers of the dry-plate type, such as copper-oxide and selenium rectifiers, and more particularly, to a rectifier system for use on aircraft.

Rectifiers are used on aircraft to rectify part or all of the output of an alternating-current generator to supply the direct-current load on the aircraft. Such rectifiers are supplied from a substantially constant-voltage source, and they are required to furnish a substantially constant direct-current output voltage. Since the load on the rectifier varies, the voltage drop through it also varies, and it is usually necessary to use a voltage regulator to introduce sufficient variation into the input voltage applied to the rectifier to maintain the output voltage substantially constant. Aircraft rectifiers are usually of the copper-oxide or selenium types, and forced cooling must be provided to prevent dangerous overheating of the rectifier plates. The complete rectifier system, therefore, consists of the rectifier itself, the voltage regulator, cooling means, such as a motor driven fan, and usually a transformer.

Copper-oxide and selenium rectifiers have a very high negative temperature-resistance characteristic in the forward direction. Thus, at normal temperatures of the plates, that is, in the range of, say 0° C. to 60° C., the resistance of the rectifier is low and the forward voltage drop through it is correspondingly low. Under these conditions, the variation in input voltage between no load and full load, required to maintain the output voltage constant, is only from 20% to 30% of the no-load input voltage, and a voltage regulator of relatively small size and weight is adequate to provide this much variation in the input voltage. In aircraft applications, however, extremely low ambient temperatures are often encountered which may range from —40° C. to as low as —70° C. at high altitudes. At these low temperatures, the forward resistance of the rectifier plates becomes extremely high, and the voltage drop through the rectifier is correspondingly high. Under these conditions, the variation in input voltage required to maintain the output voltage constant may be as high as 50% to 100% of the no-load input voltage. A voltage regulator which would be adequate to introduce this much variation in the input voltage would be relatively very large and heavy, and in most cases would be too heavy for use in aircraft.

The principal object of the present invention is to provide a rectifier system for use in aircraft in which a voltage regulator of minimum weight can be used to maintain the output voltage of the rectifier substantially constant under all temperature conditions.

Another object of the invention is to provide a rectifier system for use in aircraft in which the temperature of the rectifier plates is automatically kept in the range where the resistance of the rectifier is relatively low, so that the voltage drop through the rectifier is low and only a relatively small range of variation of input voltage is necessary to keep the output voltage constant, thus permitting the use of a small, lightweight voltage regulator.

A further object of the invention is to provide a rectifier system for use in aircraft in which the rectifier is provided with cooling means and in which the operation of the cooling means is controlled in accordance with the voltage drop through the rectifier to keep the temperature of the rectifier in the range where the voltage drop and, therefore, the required variation in input voltage, are relatively small.

A more specific object of the invention is to provide a rectifier system for use in aircraft in which the rectifier is cooled by a motor-driven fan, and in which the operation of the fan motor is controlled in accordance with variation in the input voltage so that the cooling effect is interrupted, or at least decreased, when the input voltage rises, and in which provision is also made for keeping the cooling system in full operation irrespective of the value of the input voltage in case of a very heavy load on the rectifier when dangerous overheating might occur if the cooling fan were stopped.

Figure 2:
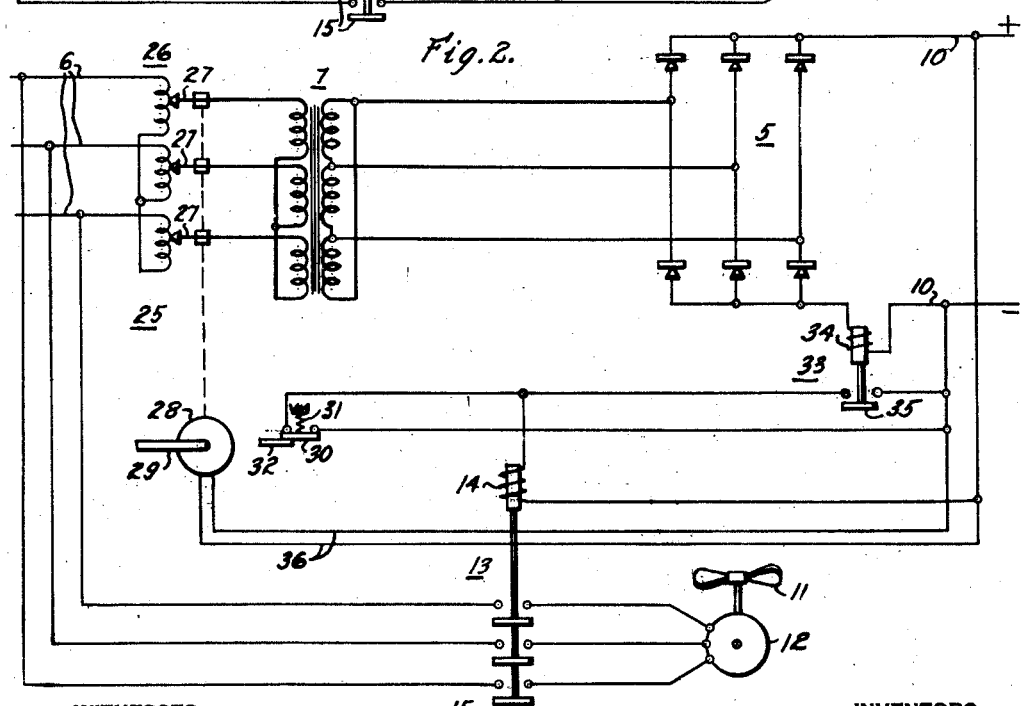

The invention will be more fully understood from the following detailed description, taken in connection with the accompanying drawing, in which:

Figure 1 is a schematic wiring diagram showing one embodiment of the invention; and Fig. 2 is a similar diagram showing another embodiment of the invention.

The rectifier system shown in Fig. 1 includes a rectifier 5 of the dry-plate type, such as a copper-oxide or selenium rectifier assembly. The rectifier 5 has been shown as a three-phase bridge-type rectifier, but it is to be understood that the invention is applicable to any type of rectifier, such as a single-phase rectifier, and that any suitable physical construction may be used. The rectifier 5 is supplied from a three-phase alternating-current line 6 which is connected to the aircraft generator, and which may, if desired, include a circuit breaker or other suitable control devices. The rectifier 5 is preferably connected to the three-phase line 6 by means of a three-phase transformer 7 to reduce the generator voltage to a suitable value to give the desired direct-current output voltage, and a voltage regulator 8 is provided to control the voltage applied to the rectifier 5. The voltage regulator has been shown connected on the high voltage side of the transformer 7, but it could obviously be connected on the low-voltage side of the transformer if desired. The voltage regulator 8 may be of any desired or suitable type which is capable of introducing sufficient variation into the voltage applied to the rectifier to maintain the output voltage of the rectifier substantially constant, and it is actuated in response to changes in the output voltage of the rectifier, as indicated by the leads 9 connected across the direct-current output leads 10 of the rectifier 5.

The rectifier 5 is cooled by means of a fan 11 which is driven by a motor 12. The motor 12 may be of any suitable type, and is shown as being a three-phase motor connected directly across the three-phase line 6. The fan motor 12 is controlled by a contactor 13 which has an operating coil 14, and which is arranged to close its contacts 15 and connect the motor 12 across the line when the coil 14 is energized. The coil 14 is connected across the direct-current output leads 10 of the rectifier 5 by means of the conductors 16, as shown, so that in normal operation the motor 12 is connected across the line 6 to drive the fan whenever the rectifier 5 is energized.

As previously explained, the resistance of the rectifier 5 in the forward direction becomes extremely high at very low temperatures, and under these conditions it would be necessary for the voltage regulator 8 to increase the input voltage applied to the rectifier to a relatively high value in order to keep the output voltage constant. In order to avoid the necessity for this wide range of variation in input voltage, and thus make it possible to use a small, lightweight voltage regulator, the present invention provides means for controlling the operation of the fan motor 12 to decrease the cooling of the rectifier in case of low temperatures. In order to do this, the input voltage itself may conveniently be used as an indication of the temperature, since its value is dependent upon the voltage drop in the rectifier and, therefore, for a given load, upon the resistance of the rectifier plates, which is determined by the temperature of the plates.

In the embodiment of the invention shown in Fig. 1, a voltage-responsive relay 17 is provided, having an operating coil 18 connected across one phase of the input voltage, and having a contact 19 connected in series with the operating coil 14 of the contactor 13. The relay 17 is adjusted so that its contact 19 is normally closed, but when the input voltage is raised above a predetermined value, which should be near the upper limit of the range of the regulator 8, the relay 17 opens its contact 19, thus deenergizing the coil 14 and causing the contactor 13 to open its contacts 15 and stop the fan motor 12; thus, the cooling of the rectifier 5 is interrupted, which causes it to heat up rapidly and thus lower its resistance.

If there is a very heavy load on the rectifier 5 so that a large current flows through it, dangerous overheating may occur if the cooling fan is stopped, and in order to avoid this danger, a current-responsive relay 20 is provided. The relay 20 has an operating coil 21 connected to carry the rectifier current, and a contact 22, which is connected to complete a by-pass circuit around the contact 19 of the relay 17. The relay 20 is adjusted so that the contact 22 is normally open, but when a heavy current flows through the rectifier, the relay 20 closes the contact 22, and the motor 12 is then maintained in continuous operation irrespective of the operation of the relay 17.

The operation of this system should now be apparent. The three-phase line 6 is energized from the alternating-current aircraft generator and supplies the rectifier 5 through the voltage regulator 8 and transformer 7. As soon as the rectifier 5 is energized, the coil 14 of the contactor 13, which is connected across the direct-current output line 10, is energized and causes the contactor 13 to close its contacts 15, thus starting the fan motor 12 to drive the cooling fan 11 to cool the rectifier. Since the relay 17 is in its deenergized position when the rectifier is at normal temperatures, the contactor 13 is normally held closed and the fan 11 is driven continuously. As the load on the rectifier 5 varies, the voltage drop through it will vary correspondingly, and the voltage regulator 8 functions to vary the input voltage applied to the rectifier sufficiently to maintain the output voltage substantially constant.

If the ambient temperature to which the rectifier 5 is subjected drops to very low values, the resistance of the rectifier increases, as explained above, and the voltage regulator 8 continues to raise the input voltage in attempting to keep the output voltage constant. When the input voltage has been increased to a predetermined point which corresponds approximately to the lowest temperature the rectifier is to be permitted to reach, and which is preferably near the upper limit of the range of the voltage regulator 8, the relay 17 picks up and opens its contact 19, thus interrupting the circuit to the coil 14. Deenergization of the coil 14 causes the contactor 13 to open its contacts 15, stopping the fan motor 12 and interrupting the cooling of the rectifier 5. Since copper-oxide or selenium rectifier plates have very low thermal capacity, the heating effect of the load current will cause the plates to heat up quite rapidly in the absence of any forced cooling, and the temperature of the rectifier plates is rapidly raised to a point where their resistance falls to a reasonable value, and the required value of input voltage also falls. As soon as this occurs and the voltage regulator 8 has reduced the input voltage, the relay 17 drops out and closes its contact 19, thus energizing the coil 14 and causing the contactor 13 to close its contacts to again start the fan motor 12 in operation. Under conditions of light load, at extremely low ambient temperatures, the rectifier plates will cool rapidly and the foregoing operation will be repeated at more or less frequent intervals. Under normal load conditions, however, at temperatures which are not extremely low, the relay 17 will operate only once, if at all, to permit the rectifier to heat up initially, and will then remain closed since the normal load current will produce enough heat to keep the rectifier temperature in the desired range.

In case of an extremely heavy load on the rectifier 5, the heating effect of the load current may be great enough to cause dangerous overheating of the rectifier even under low temperature conditions if the cooling fan 11 is stopped. Under such conditions, however, the relay 20 is energized and closes its contact 22, by-passing the contact 19 of the relay 17, so that under heavy load conditions, the fan motor 12 is kept in operation irrespective of the value of the input voltage. Under such conditions, of course, the heating effect of the load current is usually sufficient to prevent the rectifier resistance from becoming too great.

Thus the present invention provides a simple means for keeping the temperature of the rectifier 5 in the normal operating range at all times, even under very low ambient temperature conditions, and the required range of variation in the input voltage to keep the output voltage substantially constant is kept to a reasonable value so that a small and lightweight voltage regulator can be used. It will be apparent, of course, that the relays 17 and 20 might be arranged in any desired manner to perform the functions described. Thus, the relay 17 may be connected on either side of the transformer 7, and it may be either a single-phase relay, as shown, or a three-phase relay. Similarly, the current-responsive relay 20 may be either an alternating-current relay connected on the input side of the rectifier, as shown, or it may be a direct-current relay connected on the output side of the rectifier, and where the relay 20 is referred to in the specification and claims as carrying the rectifier current, it is to be understood that this refers to either the input current or the output current.

Fig. 2 shows another embodiment of the invention which may advantageously be used when the voltage regulator is of a type which involves a mechanical movement or which has a movable part, the motion of which is related to the variation in voltage produced by the regulator. In this figure, the rectifier 5 is connected through a transformer 7 to the three-phase line 6 as before, and the fan motor 12 is connected to the three-phase line 6 through the contactor 13 in the same manner as previously described. The voltage regulator 25 shown in this figure, however, comprises an autotransformer 26 with movable tap switches or brushes 27 to change the voltage ratio and thus vary the voltage applied to the rectifier 5. As shown diagrammatically in the figure, the tap switches or brushes 27 are driven by a small electric motor 28, the operation of which is controlled by changes in the direct-current output voltage of the rectifier 5, as indicated by the conductors 36 connected across the output voltage. The motor 28 is actuated in response to changes in the output voltage to move the tap switches 27 in the proper direction to change the voltage applied to the rectifier 5 in such a manner as to restore the output voltage to the desired value. This is a known type of voltage regulator and has been shown only for the purpose of illustration, since any regulator of a type involving mechanical movement could equally well be used.

The motor 28 has an arm 29 secured to its shaft and movable with it. The operation of the motor 28 is such that the position of its shaft, and, therefore, the position of the arm 29, have a fixed relation to the voltage applied to the rectifier by the auto-transformer 26. The contactor 13 of the fan motor 12 is controlled by a switch 30 which is connected in series with the operating coil 14 across the direct-current output leads 10. Since the position of the movable arm 29 is related to the input voltage applied to the rectifier 5, the switch 30 is arranged to be actuated by the arm 29 when it reaches a point in its travel which corresponds to the maximum input voltage which it is desired for the regulator 25 to supply. The switch 30 may be arranged in any desired manner to be opened by the arm 29 when it reaches the predetermined point in its travel, and the switch 30 has been shown diagrammatically as being normally held in closed position by a spring 31 and provided with a lug or arm 32 disposed in the path of the arm 29 so that when the arm 29 traveling in a clockwise direction as viewed in the drawing, strikes the lug 32, it opens the switch 30.

As before, a current-responsive relay 33 is provided to prevent opening of the contactor 13 when there is a very heavy load on the rectifier 5. In this case, the operating coil 34 of the relay 33 has been shown as connected in series with one of the direct-current output leads 10, but it will be understood, as explained above, that the relay 33 might be connected on either the direct-current side or the alternating-current side of the rectifier. The contact 35 of the relay 33 is connected to complete a by-pass circuit around the switch 30, so that when the contact 35 is closed, the coil 14 of the contactor 13 is maintained energized even when the switch 30 is opened.

It will be apparent that the operation of this embodiment of the invention is similar to the operation of the embodiment of Fig. 1. In normal operation, the fan 11 is continuously driven by the fan motor 12, since the contactor 13 is held closed by the coil 14 whenever the rectifier 5 is energized and as long as the switch 30 remains closed. In case of extremely low temperature, which increases the resistance of the rectifier plates and thus causes the regulator 25 to raise the input voltage, the arm 29, actuated by the motor 28 in the clockwise direction, strikes the lug 32 and opens the switch 30 when the arm 29 reaches a predetermined point in its travel corresponding to the highest desired input voltage. Opening of the switch 30 deenergizes the coil 14 and permits the contactor 13 to drop out, stopping the motor 12 and interrupting the cooling of the rectifier 5 so that it heats up as explained above. As soon as the rectifier has heated up and reduced its resistance so that the voltage drop through the rectifier decreases, the regulator 25 decreases the voltage applied to the rectifier 5, and when the arm 29 has rotated in the reverse direction far enough to disengage the lug 32, the switch 30 is reclosed by its spring 31, and the coil 14 is energized so that the contactor 13 recloses and restarts the fan motor 12.

The relay 33 functions in the same manner as the relay 20 described in connection with Fig. 1, and closes its contact 35 to by-pass the switch 30 in case of a heavy load on the rectifier, so that the coil 14 remains energized and the motor 12 remains in operation even though the switch 30 may be opened. Under these heavy current conditions, the heating effect of the load current is usually sufficient so that the resistance of the rectifier does not become too great under low temperature conditions, and the necessary input voltage required to keep the output voltage constant does not exceed the normal range of the regulator 25. Thus the embodiment of the invention shown in Fig. 2 operates in substantially the same manner as that of Fig. 1, but may be desirable where a type of voltage regulator is used which has a movable member the motion of which is related to the voltage applied to the rectifier.

It should now be apparent that an aircraft rectifier system has been provided in which a voltage regulator of small size and light weight can be used, since the cooling of the rectifier is controlled in such a manner that the rectifier resistance remains in the range where a reasonable variation in input voltage is sufficient to maintain the output voltage substantially constant. It is to be understood that the embodiments of the invention shown and described are only illustrative, and that various other modifications are possible within the scope of the invention. Thus, it may not always be necessary to stop the fan motor 12 completely in order to permit the rectifier to heat up sufficiently, and the contactor 13 can readily be arranged to introduce resistance into the circuit of the motor 12 when it drops out, rather than to interrupt the circuit completely, so as to reduce the speed of the motor and permit the rectifier to heat up. Similarly, the current and voltage-responsive relays and the control switch 30 have been shown as having their contacts connected in auxiliary control circuits, but in some cases it may be possible to have these contacts connected directly in the fan motor circuit itself, and such an arrangement is within the scope of the invention.

It is to be understood, therefore, that although certain specific embodiments of the invention have been shown and described for the purpose of illustration, the invention is not limited to these specific arrangements, but in its broadest aspects it includes all equivalent embodiments and modifications which come within the scope of the appended claims.

We claim as our invention:

1. In combination, a rectifier of the dry-plate type, regulating means for controlling the input voltage applied to said rectifier for maintaining the output voltage of the rectifier substantially constant, cooling means for cooling the rectifier, and means operative when said input voltage is raised above a predetermined value for controlling said cooling means to permit the rectifier to heat up.

2. In combination, a rectifier of the dry-plate type, regulating means for controlling the input voltage applied to said rectifier for maintaining the output voltage of the rectifier substantially constant, cooling means for cooling the rectifier, and means operative when said input voltage is raised above a predetermined value for interrupting the operation of said cooling means.

3. In combination, a rectifier of the dry-plate type, regulating means for controlling the input voltage applied to said rectifier for maintaining the output voltage of the rectifier substantially constant, cooling means for cooling the rectifier, means operative when said input voltage is raised above a predetermined value for controlling said cooling means to permit the rectifier to heat up, and means responsive to rectifier current for preventing said controlling means from affecting operation of the cooling means when the rectifier current exceeds a predetermined value.

4. In combination, a rectifier of the dry-plate type, regulating means for controlling the input voltage applied to said rectifier for maintaining the output voltage of the rectifier substantially constant, cooling means for cooling the rectifier, means operative when said input voltage is raised above a predetermined value for interrupting the operation of said cooling means, and means responsive to rectifier current for rendering said controlling means ineffective to prevent operation of the cooling means when the rectifier current exceeds a predetermined value.

5. In combination, a rectifier of the dry-plate type, regulating means for controlling the input voltage applied to said rectifier for maintaining the output voltage of the rectifier substantially constant, cooling means for cooling the rectifier, and voltage-responsive means for controlling said cooling means to permit the rectifier to heat up when said input voltage is raised above a predetermined value.

6. In combination, a rectifier of the dry-plate type, regulating means for controlling the input voltage applied to said rectifier for maintaining the output voltage of the rectifier substantially constant, cooling means for cooling the rectifier, and voltage-responsive means for interrupting the operation of said cooling means when said input voltage is raised above a predetermined value.

7. In combination, a rectifier of the dry-plate type, regulating means for controlling the input voltage applied to said rectifier for maintaining the output voltage of the rectifier substantially constant, cooling means for cooling the rectifier, voltage-responsive means for controlling said cooling means to permit the rectifier to heat up when said input voltage is raised above a predetermined value, and current-responsive means for preventing said voltage-responsive means from affecting the operation of the cooling means when the rectifier current exceeds a predetermined value.

8. In combination, a rectifier of the dry-plate type, regulating means for controlling the input voltage applied to said rectifier for maintaining the output voltage of the rectifier substantially constant, cooling means for cooling the rectifier, voltage-responsive means for interrupting the operation of said cooling means when said input voltage is raised above a predetermined value, and current-responsive means for rendering said voltage-responsive means ineffective to prevent operation of the cooling means when the rectifier current exceeds a predetermined value.

9. In combination, a rectifier of the dry-plate type, regulating means for controlling the input voltage applied to said rectifier for maintaining the output voltage of the rectifier substantially constant, cooling means for cooling the rectifier, and voltage-responsive relay means for stopping the operation of said cooling means when said input voltage rises above a predetermined value.

10. In combination, a rectifier of the dry-plate type, regulating means for controlling the input voltage applied to said rectifier for maintaining the output voltage of the rectifier substantially constant, cooling means for cooling the rectifier, voltage-responsive relay means for stopping the operation of said cooling means when said input voltage rises above a predetermined value, and current-responsive relay means for maintaining said cooling means in operation when the rectifier current exceeds a predetermined value irrespective of the operation of said voltage-responsive relay means.

11. In combination, a rectifier of the dry-plate type, regulating means for controlling the input voltage applied to said rectifier for maintaining the output voltage of the rectifier substantially constant, cooling means for cooling the rectifier, and voltage-responsive relay means having a contact connected to control the operation of said cooling means, said voltage-responsive relay means being adapted to actuate its contact to effect stopping of the cooling means when said input voltage rises above a predetermined value.

12. In combination, a rectifier of the dry-plate type, regulating means for controlling the input voltage applied to said rectifier for maintaining the output voltage of the rectifier substantially constant, cooling means for cooling the rectifier, voltage-responsive relay means having a contact connected to control the operation of said cooling means, said voltage-responsive means being adapted to actuate its contact to effect stopping of the cooling means when said input voltage rises above a predetermined value, and current-responsive relay means having a contact connected in a by-pass circuit around the contact of said voltage-responsive relay means, said current-responsive relay means being adapted to close its contact to complete said by-pass circuit in response to rectifier current in excess of a predetermined value, whereby the cooling means is maintained in operation irrespective of the operation of the voltage-responsive relay means.

13. In combination, a rectifier of the dry-plate type, regulating means for controlling the input voltage applied to said rectifier to maintain the output voltage of the rectifier substantially constant, said regulating means including a movable element which moves in accordance with changes in said input voltage, cooling means for cooling the rectifier, and means for controlling the operation of said cooling means, said controlling means being actuated when the movable element of said regulating means reaches a predetermined point in its travel, and the controlling means being adapted when actuated to interrupt the operation of the cooling means.

14. In combination, a rectifier of the dry-plate type, regulating means for controlling the input voltage applied to said rectifier to maintain the output voltage of the rectifier substantially constant, said regulating means including a movable element which moves in accordance with changes in said input voltage, cooling means for cooling the rectifier, means for controlling the operation of said cooling means, said controlling means being actuated when the movable element of said regulating means reaches a predetermined point in its travel, and the controlling means being adapted when actuated to interrupt the operation of the cooling means, and means responsive to rectifier current for preventing the controlling means from affecting the operation of the cooling means when the rectifier current exceeds a predetermined value.

15. In combination, a rectifier of the dry-plate type, regulating means for controlling the input voltage applied to said rectifier to maintain the output voltage of the rectifier substantially constant, said regulating means including a movable element which moves in accordance with changes in said input voltage, cooling means for cooling the rectifier, and switch means for controlling the operation of said cooling means, said switch means being actuated when the movable element of said regulating means reaches a predetermined point in its travel, and said switch means being adapted when actuated to effect interruption of the operation of said cooling means.

16. In combination, a rectifier of the dry-plate type, regulating means for controlling the input voltage applied to said rectifier to maintain the output voltage of the rectifier substantially constant, said regulating means including a movable element which moves in accordance with changes in said input voltage, cooling means for cooling the rectifier, switch means for controlling the operation of said cooling means, said switch means being actuated when the movable element of said regulating means reaches a predetermined point in its travel, and said switch means being adapted when actuated to effect interruption of the operation of said cooling means, and current-responsive relay means having a contact connected in a by-pass circuit around said switch means, said current-responsive relay means being adapted to close its contact and complete said by-pass circuit when the rectifier current exceeds a predetermined value.

CYRIL G. VEINOTT.
HERMAN J. BRAUN.